(12) United States Patent
Hair, III et al.

(10) Patent No.: US 7,405,652 B2
(45) Date of Patent: Jul. 29, 2008

(54) COMMUNICATION AND AC POWER SYSTEM

(75) Inventors: James M. Hair, III, Cheyenne, WY (US); Daniel L. Greene, Cheyenne, WY (US)

(73) Assignee: Abet Technologies, LLC, Evanston, IL (US)

( * ) Notice: Subject to any disclaimer, the term of this patent is extended or adjusted under 35 U.S.C. 154(b) by 313 days.

(21) Appl. No.: 11/231,507

(22) Filed: Sep. 21, 2005

(65) Prior Publication Data

US 2006/0076830 A1 Apr. 13, 2006

Related U.S. Application Data

(60) Provisional application No. 60/611,834, filed on Sep. 21, 2004.

(51) Int. Cl.
*G08B 1/08* (2006.01)
*G05B 11/01* (2006.01)
*G06F 15/173* (2006.01)
*H04L 12/66* (2006.01)

(52) U.S. Cl. .................. 340/538; 340/310.11; 709/223; 370/352

(58) Field of Classification Search ........................ None
See application file for complete search history.

(56) References Cited

U.S. PATENT DOCUMENTS

| | | | |
|---|---|---|---|
| 4,463,341 A | 7/1984 | Iwasaki |
| 4,477,896 A | 10/1984 | Aker |
| 4,734,919 A | 3/1988 | Tae |
| 4,999,770 A | 3/1991 | Ara et al. |
| 5,083,067 A | 1/1992 | Soushin et al. |
| 5,305,316 A | 4/1994 | Yoshida et al. |
| 5,381,553 A | 1/1995 | Nishimura et al. |
| 5,469,150 A | 11/1995 | Sitte |
| 5,479,124 A | 12/1995 | Pun et al. |
| 5,483,230 A | 1/1996 | Mueller |
| 5,525,962 A | 6/1996 | Tice |
| 5,589,813 A | 12/1996 | Nielsen |
| 5,657,324 A | 8/1997 | Itkin |
| 5,745,027 A | 4/1998 | Malville |

(Continued)

FOREIGN PATENT DOCUMENTS

AU 733334 B1 5/2001

(Continued)

*Primary Examiner*—Julie Lieu
(74) *Attorney, Agent, or Firm*—Drinker Biddle & Reath LLP

(57) ABSTRACT

A system for bidirectional data and power transmission is shown and described. In a embodiment, a network power controller provides power to a node and communicates bidirectionally with the node. In an embodiment, the network power controller is coupled to an AC power source and provides both AC and DC power to the node. In an embodiment, the network power controller and node are coupled via a conduit comprising three wires, wherein the first wire carries DC power and communications, the second wire carries AC power, and the third wire is the neutral/ground line. In another embodiment, the network power controller and node are coupled via a conduit comprising two wires, wherein the first wire carries AC power and communications and the second wire is the neutral/ground line. In an embodiment, AC power having one phase or more can be controlled at the network power controller and the node.

25 Claims, 8 Drawing Sheets

U.S. PATENT DOCUMENTS

| | | |
|---|---|---|
| 5,797,968 A | 8/1998 | Lopin et al. |
| 5,859,584 A | 1/1999 | Counsell et al. |
| 6,079,441 A | 6/2000 | Miller et al. |
| 6,115,831 A | 9/2000 | Hanf et al. |
| 6,147,963 A | 11/2000 | Walker et al. |
| 6,188,314 B1 | 2/2001 | Wallace et al. |
| 6,363,066 B1 | 3/2002 | Frimodig |
| 6,396,391 B1 | 5/2002 | Binder |
| 6,438,462 B1 | 8/2002 | Hanf et al. |
| 6,459,175 B1 | 10/2002 | Potega |
| 6,473,608 B1 | 10/2002 | Lehr et al. |
| 6,477,457 B1 | 11/2002 | Fendt et al. |
| 6,906,618 B2 | 6/2005 | Hair, III et al. |
| 6,944,500 B1 | 9/2005 | Hedberg et al. |
| 6,950,010 B2 * | 9/2005 | Aisa .................. 340/310.16 |
| 2002/0037054 A1 | 3/2002 | Schurig |
| 2002/0126574 A1 | 9/2002 | Downey, Jr. et al. |
| 2002/0130643 A1 | 9/2002 | Binder et al. |
| 2002/0150116 A1 | 10/2002 | Huang |
| 2003/0007462 A1 | 1/2003 | Makinen et al. |
| 2003/0193351 A1 | 10/2003 | Fukui |
| 2004/0041549 A1 | 3/2004 | Halfman et al. |
| 2004/0095933 A1 | 5/2004 | Lehr et al. |
| 2004/0105161 A1 | 6/2004 | Tatum et al. |
| 2004/0229660 A1 | 11/2004 | Liu et al. |
| 2005/0231355 A1 | 10/2005 | Hair, III et al. |

FOREIGN PATENT DOCUMENTS

| | | |
|---|---|---|
| EP | 0 522 179 A1 | 1/1993 |
| JP | 6-205596 A | 7/1994 |
| JP | 10-84372 A | 3/1998 |
| JP | 10-303952 A | 11/1998 |
| WO | WO 02/051668 A1 | 7/2002 |

* cited by examiner

COMMUNICATION AND AC POWER SYSTEM

CROSS-REFERENCE TO RELATED PATENT APPLICATIONS

This patent application claims the benefit of U.S. Provisional Patent Application No. 60/611,834, filed Sep. 21, 2004, which is herein incorporated by reference.

FIELD OF THE INVENTION

This invention pertains to methods and systems for distributing electrical power and data. In particular, the invention relates to a method and system for transmitting power, wherein the system can control single or multiple power phases.

BACKGROUND OF THE INVENTION

Microprocessors are found in almost every electronic device that we use in our day-to-day lives. One important application of microprocessors has been in the control of electronic devices installed in vehicles, including automobiles, buses, and airplanes. In the past, many critical automobile functions have been accomplished mechanically. Automobile functions such as wheel differential adjustments and engine timing are now controlled using sensors and actuators electrically connected to microprocessors.

Microprocessors provide well-known advantages, including making diagnostics and repairs easier in complicated machines. Microprocessors have also been used to improve the efficiency of machines when used with sensors and actuators in a feedback loop, thereby obtaining more efficient modes of operation. There are, however, some disadvantages to the use of microprocessors.

A look under the hood of a newer automobile may be enough to see one disadvantage to microprocessor use. Before microprocessors became small enough and reliable enough to be installed in automobiles, it was possible to see how separate engine parts were connected, and even to see the road underneath. Nowadays engine parts are covered by wires and cables that run from sensors and actuators attached to the mechanical parts to microprocessors used for control. Extra wires and cables are disadvantageous: every extra wire installed consumes power and adds weight. More wires also make maintenance harder.

Unfortunately, it has been largely impossible for wires to be eliminated from most microprocessor system designs. Conventionally, a separate wire has been required for power, ground, and each of a plurality of data transmission lines between a microprocessor and one or more sensors or actuators attached thereto.

U.S. Pat. No. 6,906,618, which was granted to the present inventors in 2005 and is herein incorporated by reference, discloses a method and system for bidirectional power and data transmission. The disclosed method and system reduce the number of wires used in power and data systems.

A continued need exists however for further improvements to conventional power and data systems.

BRIEF SUMMARY OF THE INVENTION

In an embodiment, a system for bidirectional data and power transmission is provided, wherein the system includes an AC power source, a network power controller coupled to the AC power source, and at least one node that receives power from the network power controller and exchanges data with the network power controller. The system also includes a conduit through which the node receives power from the network power controller and exchanges data with the network power controller. In an embodiment, the conduit has at least three wires, wherein a first wire is for transmission of AC power from the network power controller to the node, a second wire is for transmission of DC power and communications between the network power controller and the node, and a third wire is the ground/neutral line.

In another embodiment, a network power controller in a system for bidirectional data and power transmission is provided. The network power controller includes (1) a power input for receiving power from an AC power source, wherein the power input is coupled to a hot AC line and a neutral AC line, (2) a step-down circuit that provides DC power to circuitry within the network power controller from the AC power received at the power input; (3) a communications reflector for transmitting DC power and data to a node in the system, wherein the communications reflector is coupled to the step-down circuit; (4) a short control circuit for detecting overcurrent conditions on the hot AC line and for distributing AC power to the node; and (5) a microcontroller for processing signals sent and received by the network power controller, wherein the microcontroller controls the operation of the communications reflector and the short control circuit.

In another embodiment, a node in a system for bidirectional data and power transmission is provided. The node includes (1) a power and communications switch for receiving DC power from a network power controller and for exchanging communications with the network power controller; (2) a node power and short control circuit coupled to the power and communications switch, wherein the node power and short control circuit receives AC power via an AC power line and monitors the AC power line for an AC short; and (3) a microcontroller that controls the flow of AC power on the AC power line in the node power and short control circuit and receives an AC short signal from the node power and short control circuit.

In another embodiment, a system for bidirectional data and power transmission is provided, wherein the system includes an AC power source, a network power controller coupled to the AC power source, and at least one node that receives power from the network power controller and exchanges data with the network power controller. The system also includes a conduit through which the node receives power from the network power controller and exchanges data with the network power controller. In an embodiment, the conduit has at least two wires, wherein a first wire is for transmission of AC power and communications and the second wire is the ground/neutral line.

In various embodiments, an advantage of the present invention is that it allows for the intermingling of varying current requirements on a single digital current system. Individual nodes may be DC or AC nodes and will operate as constituent components within an integrated bidirectional communications and power system. In various embodiments, another advantage of the present invention is that it provides the ability to control AC power and to handle circuit shorts, opens, and other interruptions in power. This is accomplished by the fact that DC and/or AC power can be connected in a loop with system ground or neutral as common. The hot single phase of an AC line may be connected as a loop. Multiphase AC can similarly be connected in a loop, i.e., a phase one line can be connected to all other phase one lines, phase two lines can be connected to all other phase two lines, etc. A short or a break in the loop can be isolated so that the system can allow power to all portions of the loop via either side of the loop via the network power controller. These and other advantages of the invention will be apparent from the description of the invention provided herein.

DETAILED DESCRIPTION OF THE INVENTION

The present invention will now be described more fully with reference to the accompanying drawings in which exemplary embodiments of the invention are shown.

In various embodiments, the present invention provides an improved power and data system. In various embodiments, the present invention provides a system of bi-directional communications and power transport utilizing a two-wire or multi-wire conduit and Alternating Current (AC) and/or AC Carrier Current information transport systems. In various embodiments, the conduit may be a twisted pair, a coaxial cable, or the like.

Figure 5:
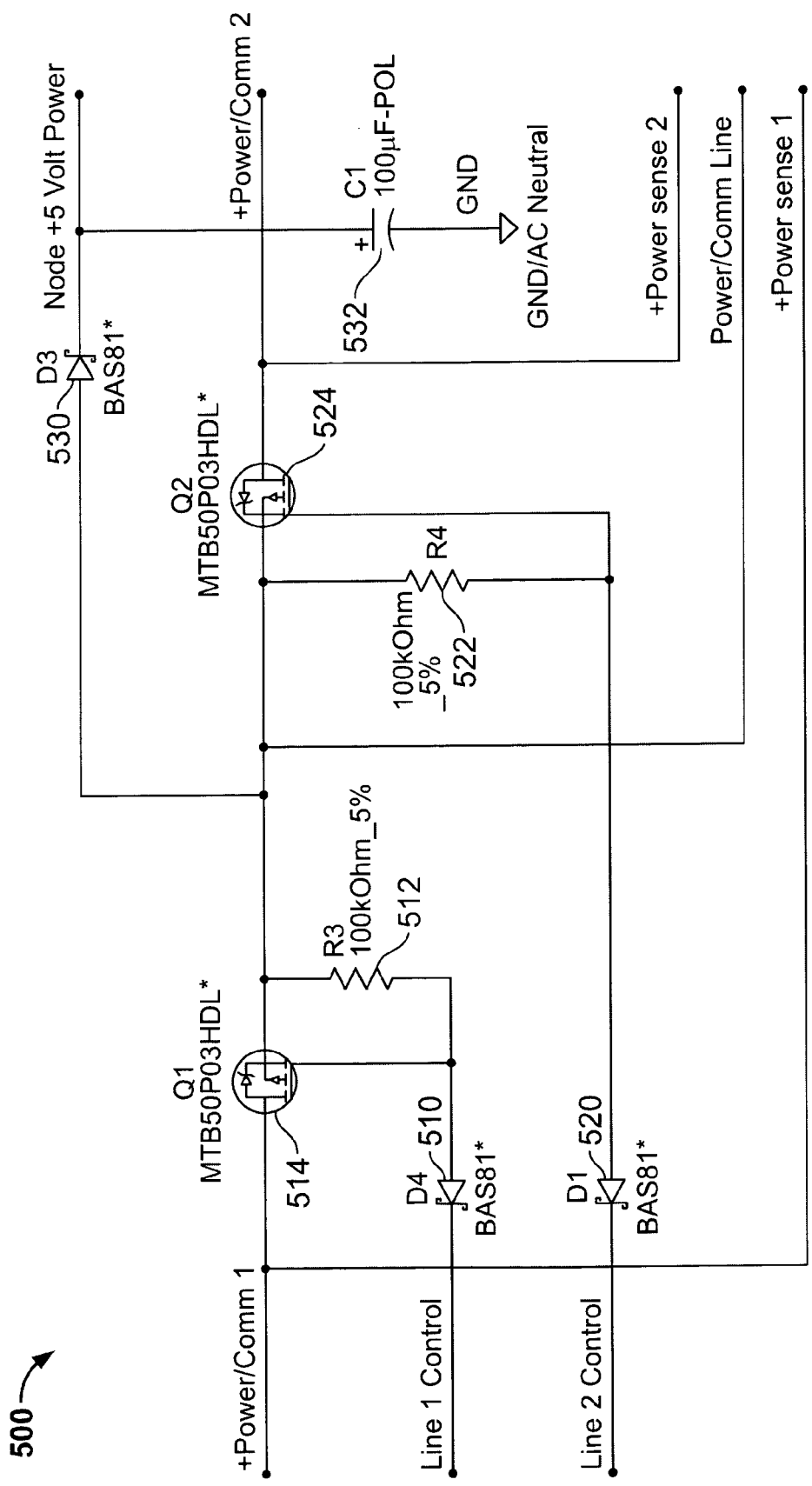
FIG. 5 is a schematic diagram illustrating an embodiment of a node DC power and communications short control switch in an embodiment of the present invention.
Figure 6:
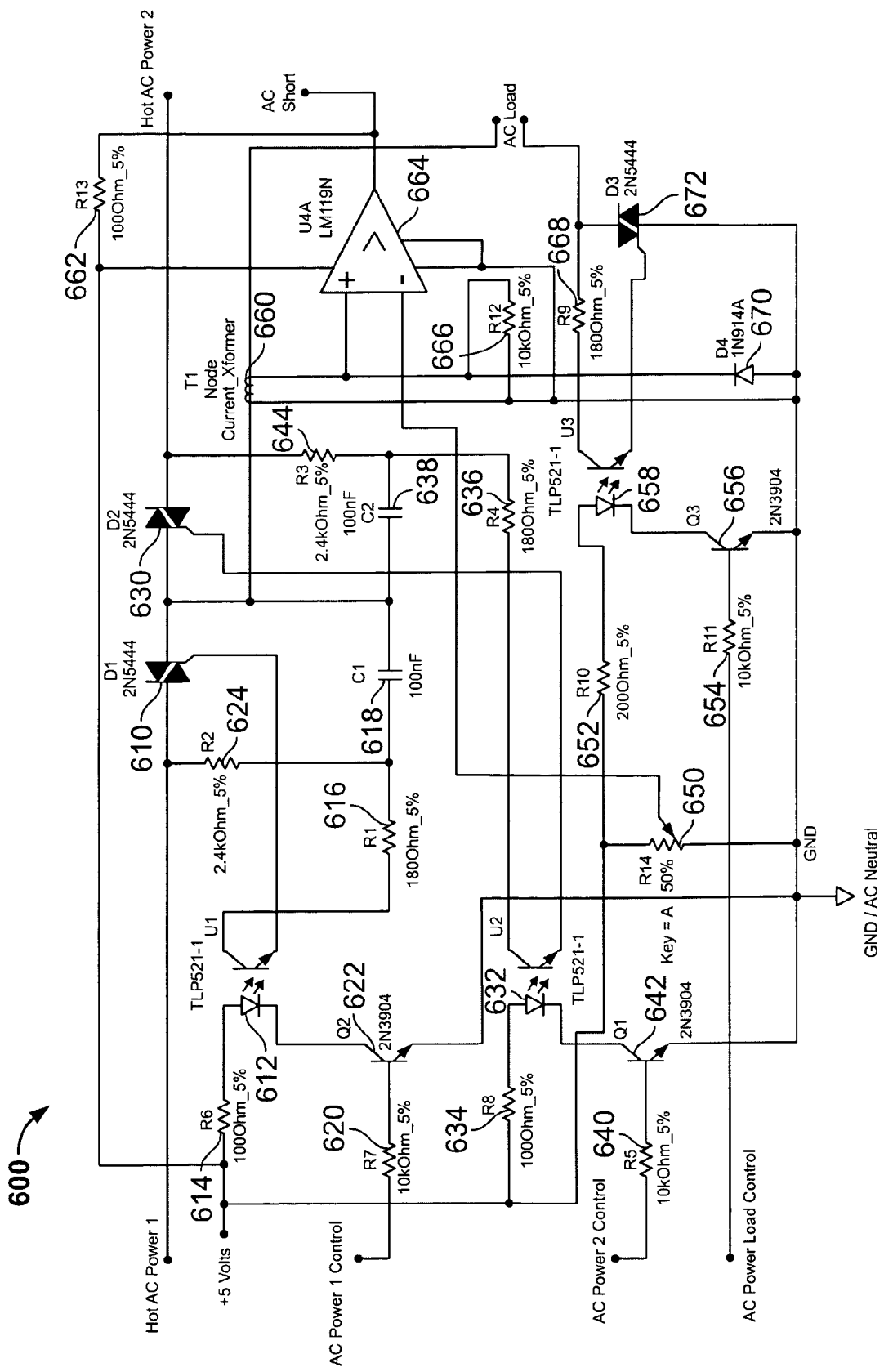
FIG. 6 is a schematic diagram illustrating an embodiment of an AC node short control circuit in an embodiment of the present invention.
Figure 7:
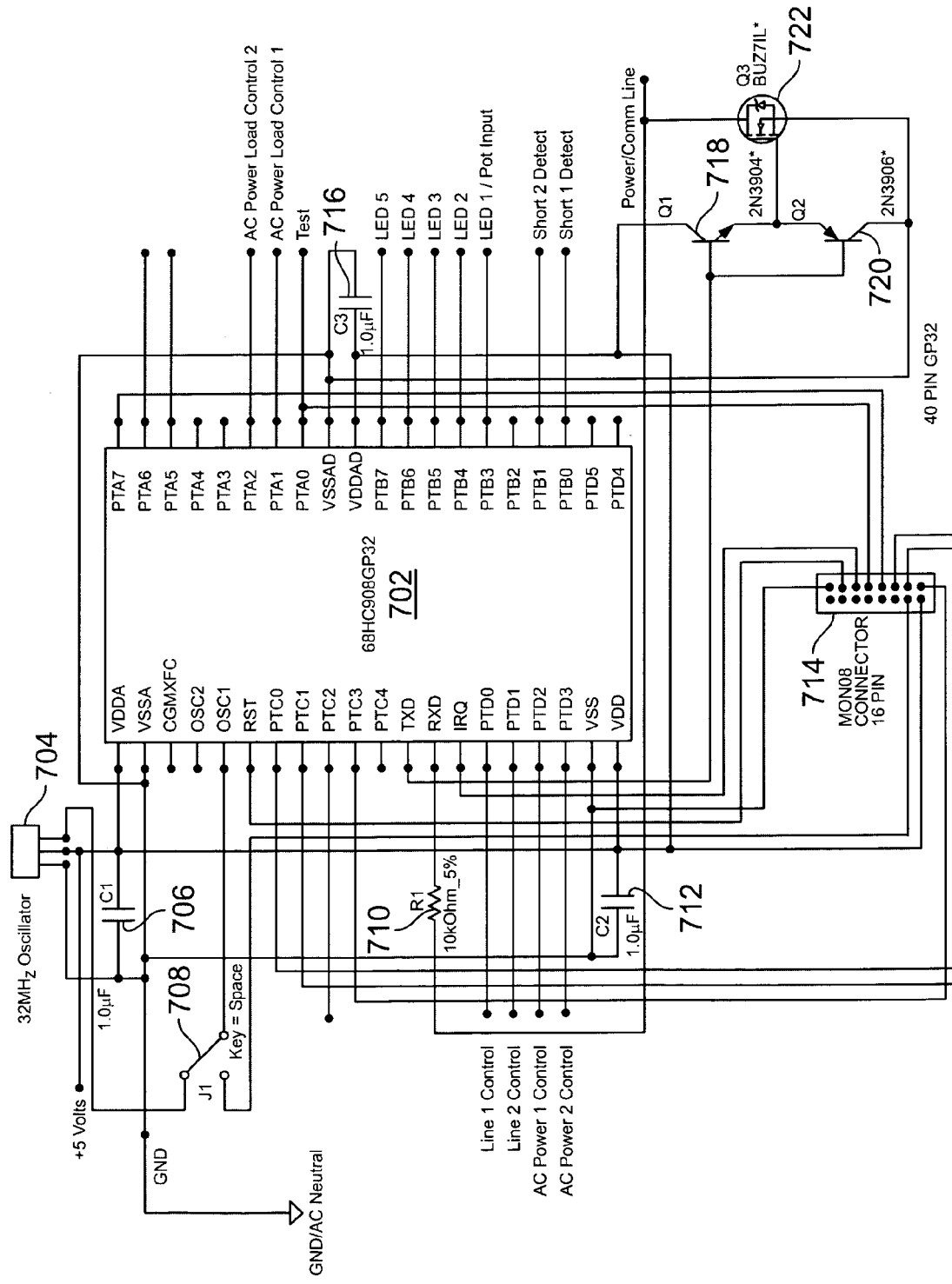
FIG. 7 is a schematic diagram illustrating a microcontroller and a node communications structure in a node in an embodiment of the present invention.

In an embodiment, an alternating current digital current system comprises a network power controller ("NPC") and at least one node, wherein the NPC and node are coupled via a two-wire or multi-wire conduit. In an embodiment, the NPC and node are coupled via a conduit comprising three wires, wherein AC power is carried via a first wire, DC power and communications are carried via a second wire, and the third wire is the AC Neutral/System Ground line. In another embodiment, the NPC and node are coupled via a conduit comprising two wires, wherein AC power and communications are carried via the first wire and the second wire is the AC Neutral/System Ground line. AC communications are carried on the same wire as the AC power through an AC Carrier Current method. In an embodiment, as shown in FIGS. 1-4, the NPC comprises a power circuit 100, a communications reflector 200, a node power and communications switch 300, a short control block 400, and a microcontroller. In an embodiment, as shown in FIGS. 5-7, a node comprises a power and communications switch 500, a node power and short control circuit 600, and a microcontroller 702. In an embodiment, individual nodes may be AC or DC, but they operate as constituent components within an integrated digital current system. In an embodiment, the primary current controlling the system is DC, which controls the AC power and provides the current necessary for both DC and AC control.

Figure 1:
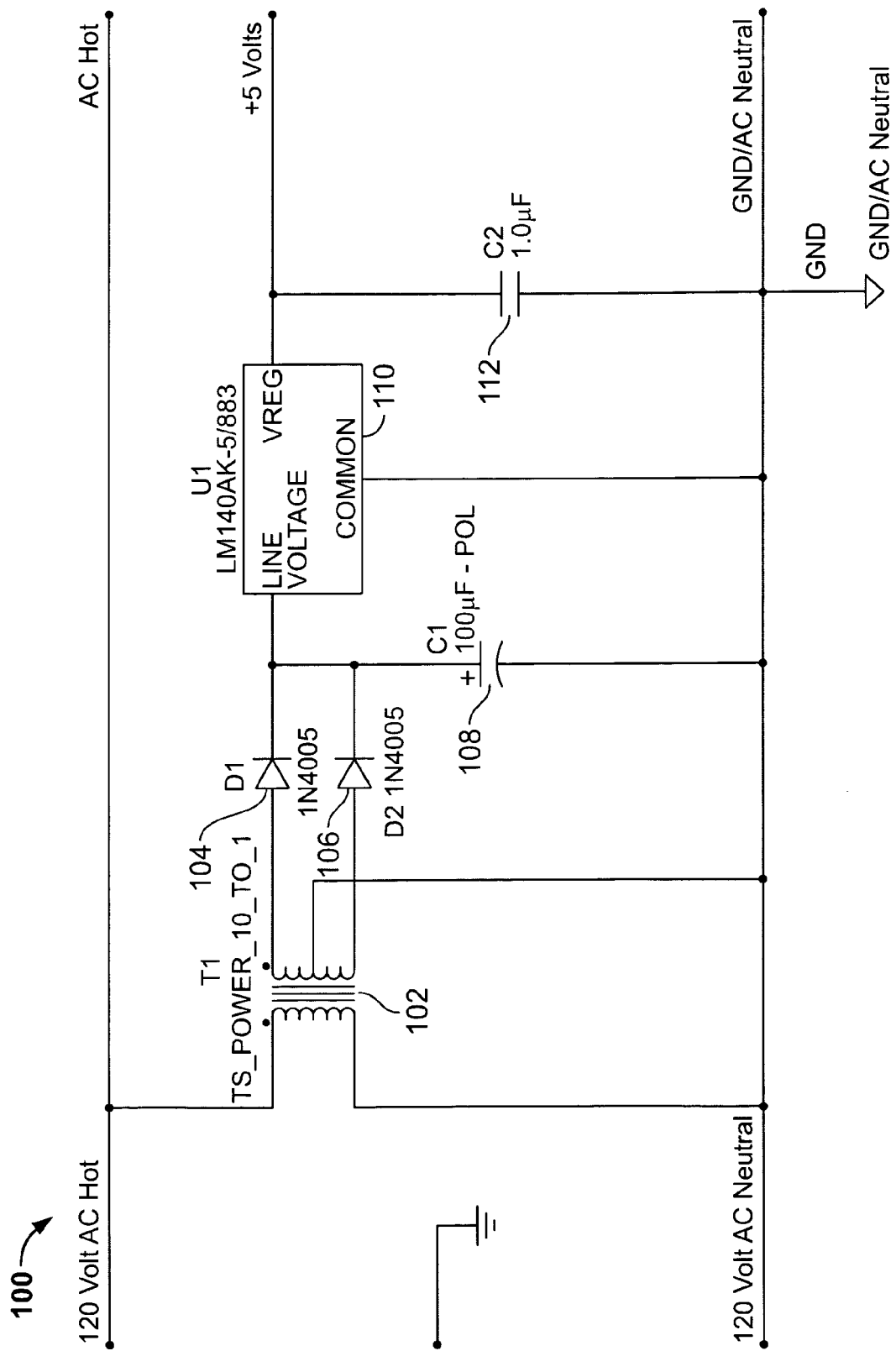
FIG. 1 is a schematic diagram illustrating an embodiment of a power circuit in a network power controller in an embodiment of the present invention.

In an embodiment, as shown in the power circuit of FIG. 1, power for the NPC and the DC and communications power for the nodes in the system are provided to the system by coupling the NPC to a single phase of an AC source via hot and neutral connections. Although the system is connected to only one phase of the AC source in this embodiment, the AC source may have one or more phases. In an embodiment, a generator provides a 120 volt AC hot supply and a 120 volt AC neutral supply that is coupled to earth ground. Main power is provided to the system by coupling the generator's hot and neutral leads to the system's AC Hot line and AC Neutral line, respectively. In an embodiment, the AC Neutral line also acts as the DC ground for the system.

In an embodiment, as shown in FIG. 1, the AC Hot and AC Neutral lines are coupled to a step-down circuit that provides DC power to a voltage regulator U1 110. The voltage regulator 110 provides regulated voltage for the microcontroller and other circuitry within the NPC. As shown in FIG. 1, an embodiment of the step-down circuit includes transformer T1 102, diodes D1 104 and D2 106, and capacitor C1 108. The primary of transformer T1 102 is connected to the AC Hot and AC Neutral lines, and the secondary of T1 102 is a step-down side of a power transformer coupled to diodes D1 104 and D2 106 and ultimately to capacitor C1 108 to produce approximately 8.5 volts for input to the voltage regulator U1. In an embodiment, the voltage regulator U1 110 outputs approximately +5 volts, with respect to the AC Neutral/System Ground line, for NPC circuitry such as a microcontroller.

Figure 2:
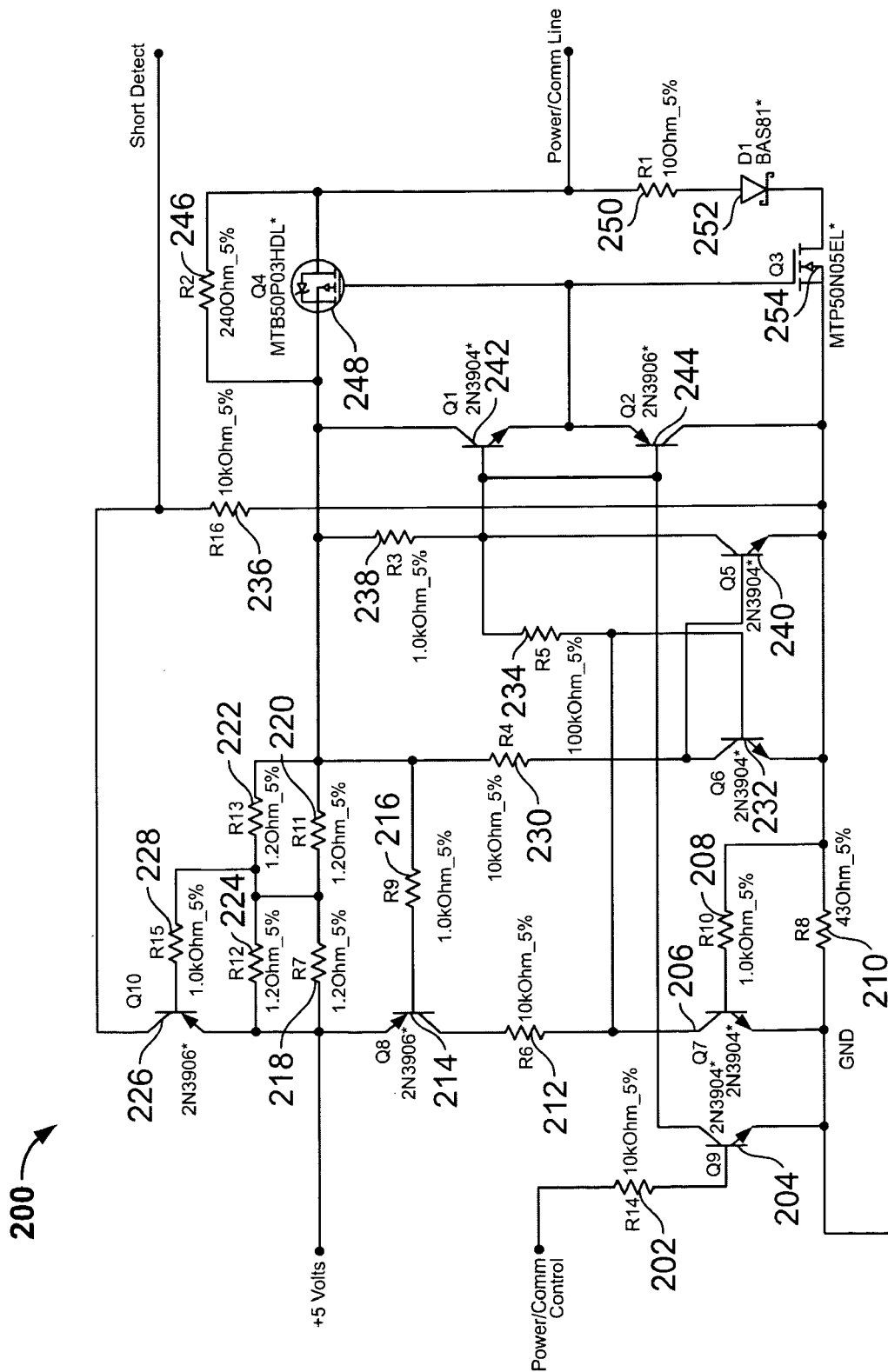
FIG. 2 is a schematic diagram illustrating an embodiment of a communications reflector in a network power controller in an embodiment of the present invention.

In an embodiment, the NPC in the system includes a communications reflector circuit 200. The communications reflector circuit 200 supplies power to the nodes and serves as a communications reflector for the DC portion of the system. An embodiment of a communications reflector circuit 200 will now be described with reference to FIG. 2. As shown in FIG. 2, power enters through the +5V line from the voltage regulator 110 and the AC Neutral/System Ground line. The +5 volts enters the circuit through a short sensing and communication resistor array. In an embodiment, the resistor array is comprised of four low-resistance resistors R7 218, R11 220, R12 224, R13 222, which together make up approximately a 1 watt, 1.2 Ohm resistor set. In an embodiment, the output of the resistor array is coupled to a main power/NPC communications switch. As shown in FIG. 2, the main power/NPC communications switch may comprise a transistor such as a p-channel mosfet Q4 248, which may be referred to as the NPC communications transistor 248. The output of the main power and communications switch is coupled to the Power/Comm. line for provision of power to the nodes and communications between the NPC and nodes. Use of the Power/Comm. line is controlled by the signal Power/Comm. Control from the microcontroller. When the Power/Comm. Control line is high, full power is transmitted to the nodes. When the Power/Comm. Control line is low, the communications reflector section is in operation, and communications may be transmitted across the Power/Comm. line.

Power transmission to the nodes will now be described. In the embodiment shown in FIG. 2, when the Power/Comm. Control line is high, transistor Q9 204 is pulled low through resistor R14 202. As a result, buffer transistors Q1 242, Q2 244 are pulled low across resistor R3 238. This causes power mosfet Q4 (the NPC communications transistor) 248 to turn on hard and power mosfet Q3 254 to turn off. As a result, the +5 Volts signal is coupled to the Power/Comm. line. In an embodiment, short detection circuitry is included within the communications reflector circuit 200. In the embodiment shown in FIG. 2, the short detection circuitry comprises resistors R7 218, R11 220, R12 224, R13 222, R15 228, and transistor Q10 226. Current on the Power/Comm. line is sensed by resistors R7 218 and R12 224. Under normal conditions, less than approximately 0.5 amps will be pulled on the Power/Comm. line to meet the DC power requirements of up to approximately 50 nodes. If a short between the Power/Comm. line and the AC Neutral/System Ground line occurs, a current greater than 1 amp will be pulled through the system. In response, resistors R7 218 and R12 224 will cause transistor Q10 226 to turn on through resistor R15 228. When transistor Q10 226 turns on, the voltage at resistor R16 236 is pulled up, thereby indicating a short condition to the microcontroller via the signal line Short Detect.

The operation of the communications reflector section will now be described. In the embodiment shown in FIG. 2, when the Power/Comm. Control line is low, transistor Q9 204 is turned off and the flip-flop comprised of transistors Q5 240 and Q6 232 then controls the condition of the buffer comprised of transistors Q1 242 and Q2 244 controlling the power mosfets Q3 254 and Q4 248. Assuming that the NPC communications transistor Q4 248 is on, i.e. power is being transmitted to the nodes via the Power/Comm. line, the buffer comprised of transistors Q1 242 and Q2 244 is low, meaning that transistor Q5 240 is turned on. Resistor R5 234 is pulled low, thereby turning off transistor Q5 240, which pulls up the base of transistor Q5 240 through resistor R4 230 and holds the flip-flop condition.

Under normal communication conditions, wherein the conditions just described above are present, transistors Q7 206 and Q8 214 are biased off because the current being pulled on the Power/Comm. Line is insufficient to cause the flip-flop comprised of transistors Q5 240 and Q6 232 to switch. When either the NPC communications transistor Q4 248 or a node communications transistor (Q3 722 of FIG. 7) is turned on greater than approximately 0.5 amps, the Power/Comm. line is pulled down to AC Neutral/System Ground. When this occurs, the resistor array R7 218, R11 220, R12 224, R13 222 causes transistor Q8 214 to turn on, pulling current through resistor R6 212, turning on transistor Q6 232, which pulls down the base of transistor Q5 240 via resistor R4 230, thereby turning off transistor Q5 240, allowing resistor R3 238 to pull the buffer comprised of transistors Q1 242 and Q2 244 high (+5 Volts), turning off the p-channel mosfet Q4 248 and turning on the n-channel mosfet Q3 254, pulling the Power/Comm. line low. When the Power/Comm. line is pulled low, the node communications transistor (Q3 718 of FIG. 7) continues to pull current down through the Power/Comm. line via the resistor array R7 218, R11 220, R12 224, R13 222 and a sustainer resistor R2 246. This current is approximately 20 mA and holds the flip-flop comprised of transistors Q5 240 and Q6 232 in a stable condition.

When transistor Q3 722 (see FIG. 7) of the NPC or a node turns off, the sustainer current through resistor R2 246 begins to flow through resistor R1 250, diode D1 252, and power mosfet Q3 254, biasing on transistor Q7 206 through resistors R8 210 and R10 208. When transistor Q7 206 pulls down, it turns off transistor Q6 232. When transistor Q6 232 is turned off, transistor Q5 240 is turned on via resistor R4 230, pulling down resistor R3 238 and the buffer comprised of transistors Q1 242 and Q2 244, which, in turn, turns off power mosfet Q3 254 and turns on the p-channel power mosfet Q4 248, thereby returning power and a mark condition to the communications line Power/Comm. Line.

Figure 3:
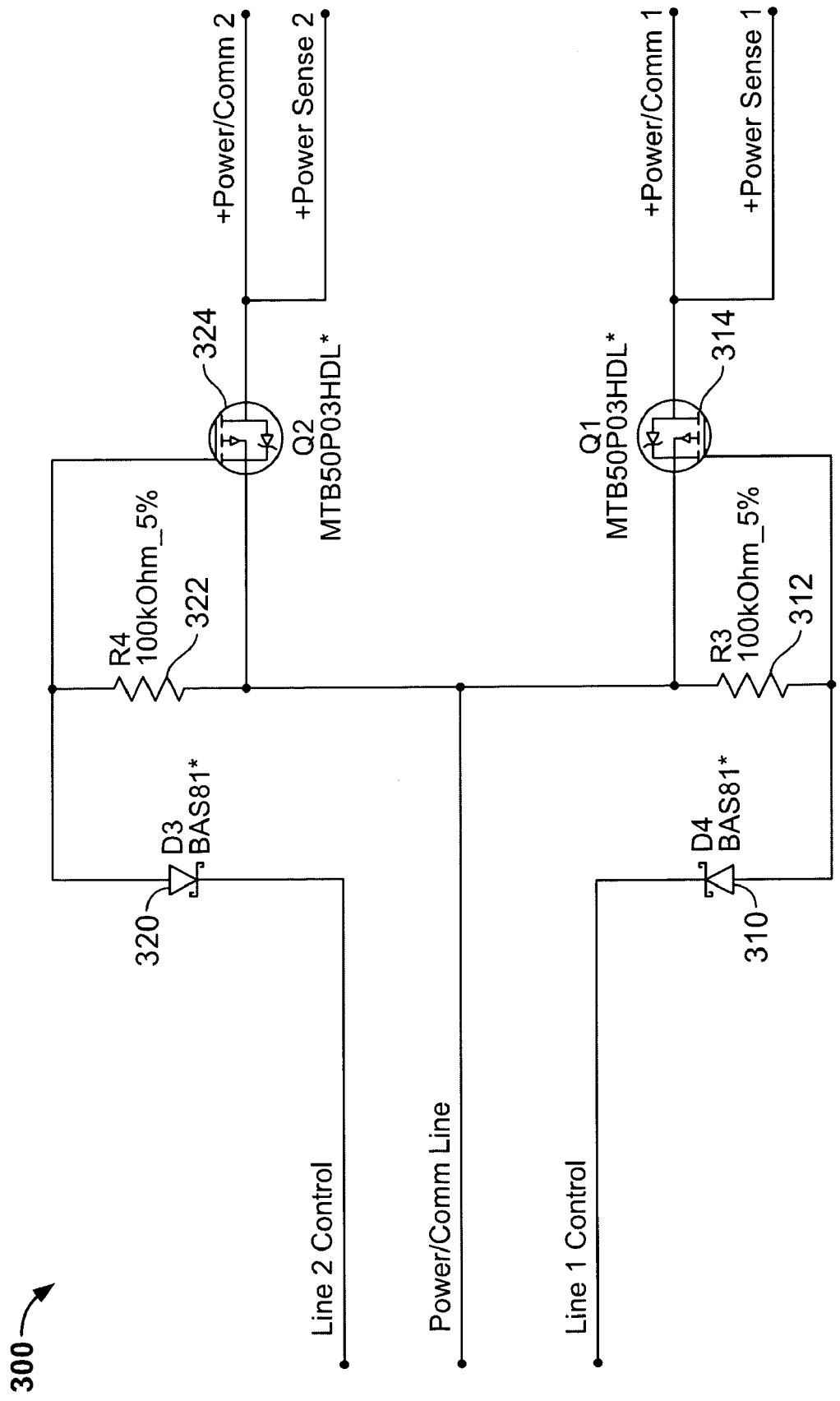
FIG. 3 is a schematic diagram illustrating a node power and communications switch in a network power controller in an embodiment of the present invention.
Figure 4:
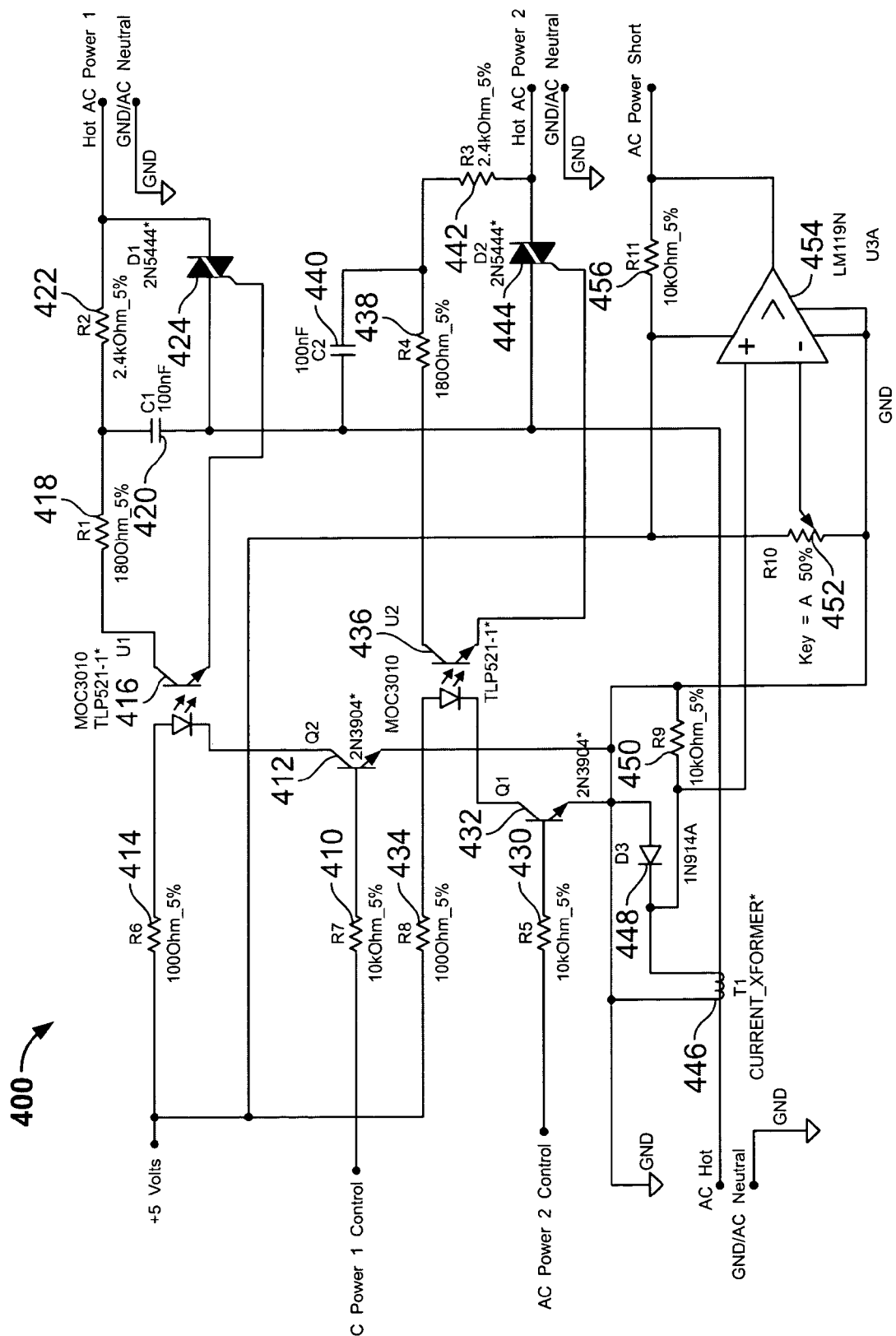
FIG. 4 is a schematic diagram illustrating an embodiment of an AC power switch and short control block in a network power controller in an embodiment of the present invention.

FIG. 3 illustrates an embodiment of the DC power and communications switch 300 included in an embodiment of the NPC. As shown in FIG. 3, communications and power are provided to the power and communications switch 300 via the main Power/Comm. line. In an embodiment, the main Power/Comm. line is coupled to two secondary Power/Comm lines. In such an embodiment, as shown in FIG. 3, the main Power/Comm. line is coupled to the sources of the p-channel power mosfets Q1 314 and Q2 324, which are controlled by the Line 1 Control signal and the Line 2 Control signal from the microcontroller, respectively. Although power p-channel mosfets are used in the embodiment shown in FIG. 3, other components such as n-channel mosfets, IGBT's, bi-polar transistors, and relays could be substituted along with appropriate biasing.

In the DC power and communications switch 300 shown in FIG. 3, if the Line 1 Control signal from the microcontroller is high, schottky diode D4 310 is biased off, and the gate of power mosfet Q1 314 is drained to the source of power mosfet Q1 314 via resistor R3 312. Similarly, if Line 2 Control is high, schottky diode D3 320 is biased off, and the gate of power mosfet Q2 324 is drained to the source of power mosfet Q2 324 via resistor R4 322. When either Line 1 Control or Line 2 Control goes low, the respective diodes D4 310 and D3 320 are forward biased and the gates of power mosfets Q1 314 and Q2 324 are pulled low if the Power/Comm. line is high, i.e., power is on or there is a marked condition, and power mosfets Q1 314 and Q2 324 will be turned on. As a result, power will be transmitted out the +Power/Comm. 1 line and the +Power/Comm. 2 line, respectively. If the Power/Comm. line is pulled low, diode D4 310 prevents the discharge of the gate capacitors of power mosfets Q1 314 and Q2 324 from discharging and allows power to be pulled through power mosfets Q1 314 and Q2 324 via the communications transistor Q3 718 (see FIG. 7). This condition generally occurs for short periods of time. In an embodiment, the condition lasts for a period of time that is much shorter than the discharge time of the gate capacitors of power mosfets Q1 314 and Q2 324 and resistors R3 312 and R4 322, which, in an embodiment, are 100 kOhm resistors.

If a short condition occurs between either the +Power/Comm. 1 line or the +Power/Comm. 2 line and AC Neutral/System Groun NPC via the +Power Sense 1 or +Power Sense 2 lines to the microcontroller. In response, the NPC will turn off Line 1 Control and Line 2 Control, thus allowing the gate capacitors of power mosfets Q1 314 and/or Q2 324 to discharge, turning off power to the +Power Comm. 1 and the +Power Comm. 2 lines.

When under a short condition, software determines the power-up sequence for the NPC and the nodes in order to isolate the short condition. The node microcontroller being powered-up senses the +Power Sense 1 and +Power Sense 2 signals. If high, the microcontroller turns on the power mosfet corresponding to that side and waits for instructions from the NPC. When the NPC directs the node to continue, the node then pulls up the other control line and turns on the other power mosfet, thereby sending power through the node to the other +Power/Comm. line. If there is no short, this sequence continues around the loop back to the NPC. If, however, there is a short after the node turns on the second control line, the entire system will turn off due to the short sensed at the NPC. The NPC registers the short and starts to bring the system up in the same manner again; however, it instructs the node that would cause the short not to turn on its line control signal. The NPC then stars from the other side of the system loop and starts bringing up nodes from this side until a short is detected. In the case of a signal short in the loop, all nodes will function properly and AC control is still available.

In an embodiment, the NPC includes an NPC short control block 400. The NPC short control block 400 controls the power distribution and power splits for the AC Hot lines. An embodiment of the NPC short control block 400 will now be described with reference to FIG. 4. AC power comes into the circuit via the AC Hot line and goes to triacs D1 424 and D2 444 and out to the hot power lines AC Hot Power 1 and AC Hot Power 2. In an embodiment, the input of a current transformer T1 446 is connected to the AC Hot line, and its output goes to comparator U3A 454 and out to the microcontroller for detecting overcurrent conditions via the signal AC Power Short. The AC Hot Power 1 and AC Hot Power 2 lines are controlled by the signals AC Power 1 Control and AC Power 2 Control, through optoisolators U1 416 and U2 436 to triacs D1 424 and D2 444, respectively.

In an embodiment, a node contains a power and communications switch 500. An embodiment of such a switch will now be described with reference to FIG. 5. Incoming DC power and communications enters through either the +Power/Comm. 1 line or the +Power/Comm. 2 line. The interconnected source between transistors Q1 514 and Q2 524 acts as the power source for the node, and power is conditioned via diode D3 530 and capacitor C1 532 to provide approximately +5 Volts for the node. The source connection between transistors Q1 514 and Q2 524 also acts as the Power/Comm. line for communications between the nodes and the NPC. Control for short conditions is provided through signals Line 1 Control and Line 2 Control, which control transistors Q1 514 and Q2 524 respectively.

In an embodiment, a node contains circuitry for AC node power and short control 600. An embodiment of such AC node power and short control circuitry 600 is shown in FIG. 6. AC power enters the circuit via Hot AC Power 1 and/or Hot AC Power 2 at the junction between triacs D1 610 and D2 630. Triacs D1 610 and D2 630 control the pass-through and the link to the node power. The triacs D1 610 and D2 630 are controlled via control lines AC Power 1 Control and AC Power 2 Control from the node's microcontroller, through optoisolators U1 612 and U2 632, respectively. Output for an AC load is controlled by the AC Power Load Control signal from the microcontroller, through optocoupler U3 658 and triac D3 672. The load current is monitored via current transformer T1 660 and comparator U4A 664, generating the AC Short signal for the microcontroller. Power return for the hot side of the circuit and any AC load is through the AC Neutral/System Ground line.

The NPC and each node include a microcontroller 702. FIG. 7 illustrates an embodiment of a microcontroller and communications structure found in a node. The microcontroller 702 is connected to the Power/Comm. line. Although transistor Q3 718 of FIG. 7 is shown as a power mosfet, other suitable components such as a BJT could be substituted in an embodiment. While FIG. 7 illustrates the microcontroller 702 and associated circuitry found within a node, it could also be adapted for use in the NPC. The microcontroller 702 included within the NPC includes the connections shown in FIG. 7; however, the NPC's microcontroller 702 would also include connections for Short Detect, Power/Comm. Control, and AC Power Short signals. In an embodiment, the Short Detect signal would be coupled to pin PTB2, the Power/Comm. Control signal would be coupled to in PTA3, and the AC Power Short signal would be coupled to pin PTA4.

In various embodiments of the present invention, triac circuitry is included. The triacs have a drop of approximately 1.2 volts per unit. In an embodiment, the NPC has one triac drop and each node has two triac drops.

Figure 8:
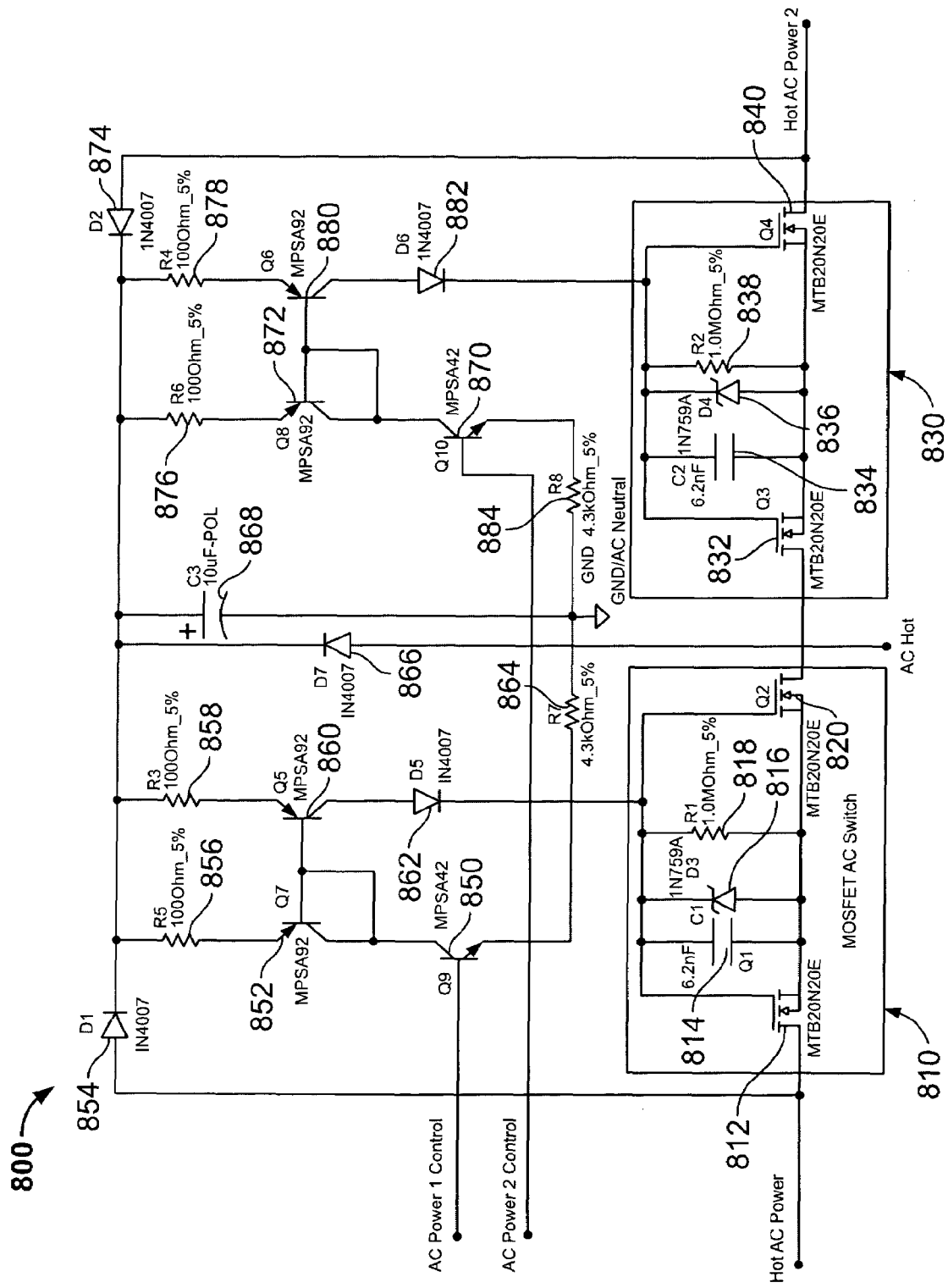
FIG. 8 is a schematic diagram illustrating another embodiment of a short control circuit included within an embodiment of the present invention.

In an embodiment, high voltage power mosfets are used to replace triacs. For example, the triac structure in the short control circuitry of FIG. 6 may be replaced by mosfet circuitry in order to eliminate the 1.2 volt drop per unit associated with triacs. The triacs are replaced by two pairs of mosfets are connected back-to-back, i.e., source-to-source, with proper gate drivers. In an alternate embodiment of the short control circuitry at the node, as shown in FIG. 8, n-channel mosfets are used, and each pair of n-channel mosfets has a capacitor, a protection zener diode, and a discharge resistor. AC power enters the circuit through the Hot AC Power 1 line and/or the Hot AC Power 2 line and exits through the AC Hot line. The circuit is controlled by the signals AC Power 1 Control and AC Power 2 Control. A first short control circuit is shown in the left half of FIG. 8 and operates as follows. Under normal operating conditions, the mosfets Q1 812 and Q2 820 are off due to resistor R1 818 discharging capacitor C1 814 and the gate capacitors of mosfets Q1 812 and Q2 820. In the illustrated embodiment, when the AC Power 1 Control signal is pulled up to +5 Volts, transistor Q9 850 turns on and pulls up resistor R7 864, thereby allowing approximately 1 mA of current to flow. This current is translated to the current mirror comprised of transistors Q5 860 and Q7 852 and resistors R3 858 and R5 856. When this current flows through transistor Q7 852 and resistor R5 856, the base of transistor Q7 852 also biases transistor Q5 860 on, causing current to flow through resistor R3 858 and out the collector of Q5 860, through diode D5 862, pulling up and turning on the gates of mosfets Q1 812 and Q2 820 to the limit set by zener diode D3 816. When the mosfets Q1 812 and Q2 820 are turned on, AC power is allowed through the switch. In an embodiment, the AC mosfet short control circuit has two of the above described circuits, allowing control of two separate AC circuits. A second circuit is illustrated on the right half of FIG. 8. The second circuit operates in the same manner as the first circuit, but it is coupled to AC Hot Power 2 and AC Power Control 2. As stated above, power is received at the nodes via either or both of the Hot AC Power 1 and Hot AC Power 2 lines. If the node's microcontroller 702 turns on both the AC Power 1 Control signal and the AC Power 2 Control signal, then AC power is available at the next node and is sent through the Hot AC Power 1 or Hot AC Power 2 line to the next node.

In an alternate embodiment of the AC power switch and short control block 400 of the NPC shown in FIG. 4, high voltage power mosfet circuitry such as that described above replaces the triac circuitry shown in FIG. 4. In the NPC, power comes into the circuit on the AC Hot line and is distributed to the nodes via Hot AC Power 1 and Hot AC Power 2.

In an embodiment, short sensing at the NPC and/or nodes comprises the same circuitry regardless of whether triac or power mosfet switching is employed in the short control circuit.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A system for bidirectional data and power transmission, the system comprising:
   an AC power source;
   a network power controller coupled to the AC power source;
   at least one node, wherein the node receives power from the network power controller and exchanges data with the network power controller,
   a conduit through which the node receives power from the network power controller and exchanges data with the network power controller, the conduit comprising a first, second, and third wire, wherein the first wire carries AC power, the second wire carries DC power and communications, and the third wire is a neutral/ground line.

2. The system of claim 1, wherein the network power controller is coupled to a single phase line and a neutral line of the AC power source.

3. The system of claim 1, wherein the network power controller includes a step-down circuit for providing DC power to the network power controller.

4. The system of claim 1, wherein the network power controller includes a communications reflector circuit for providing DC power to the node and for transmitting communications to the node.

5. The system of claim 1, wherein the network power controller includes a short control circuit for detecting overcurrent conditions in the system.

6. The system of claim 1, wherein the network power controller includes a triac for controlling the flow of AC power from the network power controller to the node.

7. The system of claim 1, wherein the node includes a triac for controlling the flow of AC power into the node.

8. The system of claim 1, wherein the node includes a mosfet AC switch comprising two pairs of mosfets connected source-to-source for controlling the flow of AC power into the node.

9. The system of claim 1, wherein the node includes circuitry for detecting an AC short.

10. The system of claim 1, wherein the node is coupled to an AC load.

11. A network power controller in a system for bidirectional data and power transmission, the network power controller comprising:
    a power input for receiving power from an AC power source, wherein the power input is coupled to a hot AC line and a neutral AC line;
    a step-down circuit for providing DC power to circuitry within the network power controller, wherein the step-down circuit is coupled to the power input;
    a communications reflector for transmitting DC power and data to a node in the system, wherein the communications reflector is coupled to the step-down circuit;
    a short control circuit for detecting overcurrent conditions on the hot AC line and for distributing AC power to the node; and
    a microcontroller for processing signals sent and received by the network power controller, wherein the microcontroller controls the operation of the communications reflector and the short control circuit.

12. The network power controller of claim 11, wherein the power input is coupled to a single phase line and a neutral line of the AC power source.

13. The network power controller of claim 11, wherein the communications reflector comprises:
    a short-circuit detection circuit coupled to the microcontroller; and
    a power and communications switch controlled by the microcontroller for controlling the flow of DC power and communications between the network power controller and the node.

14. The network power controller of claim 11, wherein the short control circuit includes a triac that controls the flow of AC power from the network power controller to the node in response to a control signal from the microcontroller.

15. The network power controller of claim 11, wherein the short control circuit includes a mosfet AC switch comprising two pairs of mosfets connected source-to-source that control the flow of AC power from the network power controller to the node in response to a control signal from the microcontroller.

16. The network power controller of claim 11, further comprising a DC power and communications switch for switching between a power transmission mode and a communications mode.

17. The network power controller of claim 11, wherein the microcontroller is configured to detect and isolate short-circuits on a power line in the system.

18. A node in a system for bidirectional data and power transmission, wherein the node comprises:
    a power and communications switch for receiving DC power from a network power controller and for exchanging communications with the network power controller;
    a node power and short control circuit coupled to the power and communications switch, wherein the node power and short control circuit receives AC power via an AC power line and monitors the AC power line for an AC short; and
    a microcontroller that controls the flow of AC power on the AC power line in the node power and short control circuit and receives an AC short signal from the node power and short control circuit.

19. The node of claim 18, wherein the node power and short control circuit includes a triac that controls the flow of AC power into the node in response to a control signal from the microcontroller.

20. The node of claim 18, wherein the node power and short control circuit includes a mosfet AC switch comprising two pairs of mosfets connected source-to-source that control the flow of AC power from the network power controller to the node in response to a control signal from the microcontroller.

21. The node of claim 18, wherein the node power and short control circuit is coupled to an AC load and the microcontroller controls the AC load.

22. The node of claim 21, wherein the AC load comprises at least one AC phase.

23. A system for bidirectional data and power transmission, the system comprising:
- an AC power source;
- a network power controller coupled to the AC power source, wherein the network power controller includes a short control circuit for detecting overcurrent conditions in the system;
- at least one node, wherein the node receives power from the network power controller and exchanges data with the network power controller; and
- a conduit through which the node receives power from the network power controller and exchanges data with the network power controller, the conduit comprising a first and second wire, wherein the first wire carries AC power and communications, and the second wire is the neutral/ground line.

24. A system for bidirectional data and power transmission, the system comprising:
- an AC power source;
- a network power controller coupled to the AC power source;
- at least one node, wherein the node contains circuitry for detecting an AC short, and the node receives power from the network power controller and exchanges data with the network power controller; and
- a conduit through which the node receives power from the network power controller and exchanges data with the network power controller, the conduit comprising a first and second wire, wherein the first wire carries AC power and communications, and the second wire is the neutral/ground line.

25. A system for bidirectional data and power transmission, the system comprising:
- an AC power source;
- a network power controller coupled to the AC power source, wherein the network power controller includes a step-down circuit for providing DC power to the network power controller;
- at least one node, wherein the node receives power from the network power controller and exchanges data with the network power controller, and the node includes a step-down circuit for providing DC power to the node; and
- a conduit through which the node receives power from the network power controller and exchanges data with the network power controller, the conduit comprising a first and second wire, wherein the first wire carries AC power and communications, and the second wire is the neutral/ground line.

* * * * *